Dec. 7, 1965   J. K. JACOBUS   3,222,641
TIRE INFLATION INDICATOR
Filed Nov. 3, 1961
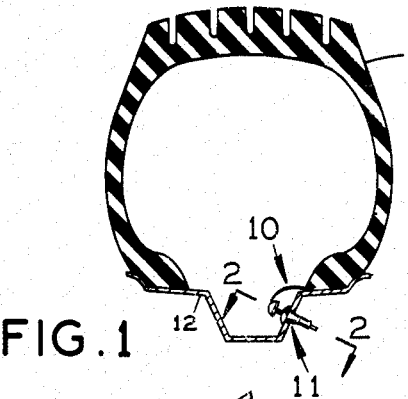
FIG. 1
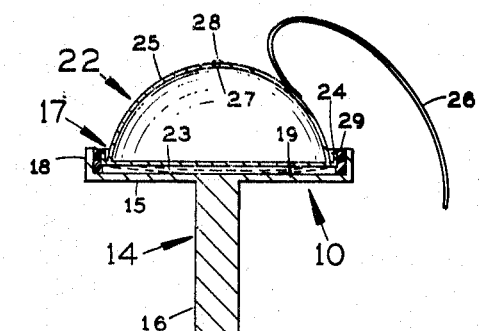
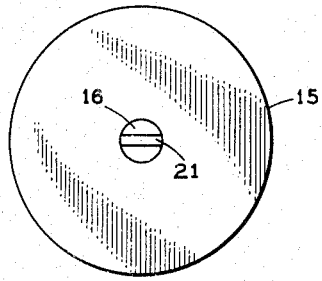
FIG. 3
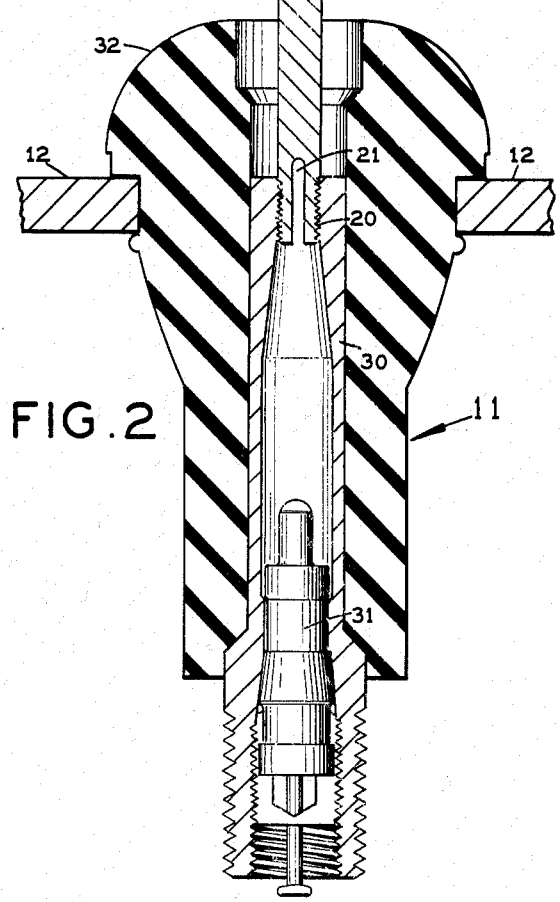
FIG. 2
FIG. 4
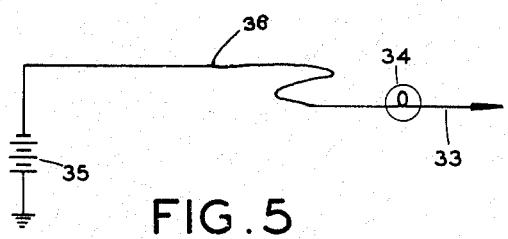
FIG. 5
INVENTOR.
JERÈ K. JACOBUS
BY
Ernest H. Schmidt
ATTORNEY

United States Patent Office 3,222,641
Patented Dec. 7, 1965

1

3,222,641
TIRE INFLATION INDICATOR
Jerè K. Jacobus, 2917 Forrest Terrace, Fort Pierce, Fla.
Filed Nov. 3, 1961, Ser. No. 149,937
7 Claims. (Cl. 340—58)

This invention relates to pneumatic tires and is directed particularly to an improved inflation indicator for vehicle tires.

Pneumatic tires such as are used on automobiles and trucks for example, are designed to operate with a predetermined mass of gas as defined by a pressure specification at a specific temperature. Since the flexing of a properly inflated tire on a moving vehicle causes considerable internal heat which is not easily dissipated through the rubber and fabric of the tire, its running temperature is normally very much greater than the temperature of the surrounding air. Manufacturers' recommended tire inflation pressures for proper and economical performance of a given tire are related to standing temperature, however, usually given as 32 degrees Fahrenheit, and all tire inflation measurements should properly be made while the tire is cold and before running on the tire. This is seldom done in practice, however, as tires are usually inflated at service stations after having developed considerable heat from driving. As a result, a properly inflated tire at an elevated pressure because of heated internal air will more often than not be bled to conform to the manufacturer's prescribed lower pressure, thereby actually creating a condition of underinflation in the tire, which, in turn, greatly increases the rate of tire wear. A greatly underinflated tire, moreover, will develop high enough internal temperatures to destroy the tire, and is therefore a potential source of hazardous blow-out resulting from excessive pressure increase.

It is accordingly the principal object of my invention to provide a tire inflation indicator that will accurately indicate whether or not a tire is properly inflated at any temperature condition of the tire.

Another object is to provide a tire inflation indicator which comprises a pressure and temperature sensitive electric switch controlled by a pressure chamber adapted to be fitted within the tire and thereby subjected to the same temperature as the tire under its various temperature conditions of use.

Another, more particular object is to provide a tire inflation indicator of the above nature which is especially well adapted for use with tubeless tires, and which is sensitive enough to indicate any predetermined underinflation.

Yet another object of the invention is to provide an inflation indicator of the character described which can readily be connected with an electrical signal device on a vehicle dashboard so as to continually monitor tire inflation even while the car is being driven.

Still another object is to provide an inflation indicator of the character described which is simple in construction, inexpensive to manufacture, easy to install, durable in use and dependable and accurate in operation.

Other objects, features and advantages of the invention will be apparent from the following description when considered with reference to the accompanying drawings.

FIG. 1 is a cross-sectional view of a tubeless tire mounted on a wheel rim illustrating the inflation valve and an inflation indicator embodying the invention assembled thereto, FIG. 2 is longitudinal cross-sectional view of the valve and indicator, shown separately and on an enlarged scale, FIG. 3 is an outer end view of the indicator illustrated in FIG. 2, FIG. 4 is an inner end view thereof, and FIG. 5 is a diagram illustrating an electrical probe for test measurement of tire inflation and making use of the automobile battery as a source of electrical energy.

2

Referring now in detail to the drawings, 10 designates, generally, an inflation indicator according to the invention assembled at the inside of an inflation valve 11 fitted in a tire rim 12 upon which is mounted a tubeless pneumatic tire 13.

As illustrated in FIGS. 2, 3 and 4, the tire inflation indicator 10 comprises a body member 14 having a short cylindrical head portion 15 and an axial rod-like mounting stud portion 16 integrally formed therewith of an electrically conductive material such as brass. The head portion 15 is formed with a coaxial cylindrical recess 17 defined by an annular wall 18 and a flat bottom wall 19. The outer end of the stud portion 16 of the body member 14 is externally threaded with a thread 20 and, as can be seen in FIGS. 2 and 4, said stud portion is formed with a diametrical slot 21.

Seated within the recess 17 of the body member 14 is a hemispherical pressure chamber 22 comprising a thin sheet metal diaphragm 23 having a short peripheral annular wall 24 within which is seated and hermetically sealed thereto, as by soldering, a dome portion 25, which also may be of a thin sheet metal. Soldered or otherwise electrically connected to the dome portion 25 is a short flexible lead wire 26, for the purpose hereinbelow described.

The pressure chamber 22 during manufacure is pressurized and sealed at the recommended inflation pressure and temperature of the tire with which it is to be used. For example, since most tubeless balloon tires for present day passenger cars require 24 pounds per square inch measured at 32 degrees Fahrenheit, the pressure chamber 22 would be provided with such an internal pressure at such temperature for use with such tires. This can be done by providing a small hole 27 at the crown of the dome portion 25 and sealing this hole after assembly of the pressure chamber 22 as described above with a small amount of a cold sealing agent such as epoxy resin 28, while maintaining the unit in a pressure room or enclosure maintained at 24 pounds per square inch at 32 degrees Fahrenheit.

As illustrated in FIG. 2, the pressure chamber 22 seats against a ring 29 of electrical insulation material having a right angular cross-sectional shape, said ring serving to electrically insulate said pressure chamber from the body member 14.

In use, the inflation indicator 10 is assembled to the inflation valve 11 prior to mounting of the tire, by screwing the threaded stud end of said inflation indicator into the inner end of the metal sleeve 30 of said inflation valve (see FIGS. 1, 2). The inflation valve 11 is of conventional construction, and comprises a valve core 31 screwed within the upper end of the valve sleeve 30. The metal sleeve 30 of the valve 11 is sealed within a rubber valve stem, the lower end of which is formed with an enlarged head portion 32 adapted to seal against the inside if the tire rim 12. It will thus be apparent that the metal sleeve 30 will be electrically insulated from the tire rim 12 and therefore insulated from the automobile chassis. In mounting the tire 13 on the rim 12, the lead wire 26 is placed between said rim and the tire bead, so that electrical connection is maintained between the pressure chamber 22 and said rim, and consequently between said pressure chamber and the metal chassis of the car. The slot 21 in the stud portion 16 of the inflation indicator 10 provides an opening through which air will pass during inflation through the inflation valve 11. When the correct inflation is reached, i.e., the same pressure as contained by the pressure chamber 22 in the illustrated example, diaphragm 23 will move from the extended convex position as illustrated by the dotted line representation thereof in FIG. 2, wherein it is in contact with the bottom wall 19 of the body member 14, to the full line representation thereof as shown by solid lines, thereby breaking electrical contact between said pressure chamber and said body member and, consequently, electrical contact between chassis (ground) and sleeve 30 of valve 11. Any convenient means can be used for determining when electrical contact is broken between the body member 14 and the pressure chamber 22, i.e., that instant when the predetermined tire inflation has been reached. For example, as illustrated in FIG. 5, a metal probe 33 having a series-connected indicator lamp 34 could be connected to the vehicle battery 35 through an extensible flexible lead wire 36. If the probe is touched to the outer end of the metal valve sleeve 30 while the tire is underinflated, an electrical circuit is completed from the vehicle ground through the battery 35, the flexible wire 36, the indicator lamp 34, the valve sleeve 30, the inflation indicator body member 14, the diaphragm 23, dome portion 25 and lead wire 26 of the pressure chamber 22, and the vehicle chassis through the tire rim 12, to energize said indicator lamp. The circuit will be broken when proper tire inflation is reached and the diaphragm 23 moves out of contact with the bottom wall 19 of the body member 14, as described above. Test of the probe circuit lamp can easily be made by touching the probe 33 to any grounded metal portion of the vehicle. Since the pressure chamber 22 is located well within the interior of the tire assembly, it will operate at substantially the same temperature as the temperature of the air within the tire. Therefore, temperature and pressure increases within the tire during travel will be balanced by substantially the same temperature and pressure increases within the pressure chamber 22, so that accurate indication of proper tire inflation will be given at all temperatures normally encountered in driving.

While I have illustrated and described herein only one form in which the invention can conveniently be embodied in practice, it is to be understood that this form is presented by way of example only, and not in a limiting sense, and that various changes and additions could be made without departing from the invention. The invention, in short, is limited only by the scope and spirit of the following claims:

What I claim as new and desire to secure by Letters Patent is:

1. An inflation indicator for tubeless pneumatic tires comprising, in combination, a substantially constant volume hermetically sealed pressure chamber having an electrically conductive diaphragm movable between inner and outer positions, an electrically conductive elongated body member, said pressure chamber being fixed at one end of said body member with said diaphragm in electrical contact with a portion of said body member when said diaphragm is in its outer position, means electrically insulating said pressure chamber from said body member when said diaphragm is in its inner position, means for electrically and mechanically connecting the other end of said body member to the interior metal sleeve portion of a tire valve so that said one end of said body member projects outwardly of the inner end of the tire valve, and means for electrically connecting said diaphragm to the metal rim of the tire wheel, said pressure chamber being internally pressurized with gas to a degree corresponding to normal inflation for a given tire, whereby said diaphragm will move from its outer to its inner position when surrounding air pressure is brought up to the same value as that within said chamber, regardless of the surrounding air temperature.

2. An inflation indicator as defined in claim 1 including electrical signal means for indicating when said diaphragm moves out of contact with respect to said body member.

3. In an inflation indicator for use with tubeless pneumatic tire vehicle wheels having a metal rim and a rubber-sealed inflation valve fitted in the rim, the combination comprising, a substantially constant volume hermetically sealed pressure chamber having an electrically conductive diaphragm movable between inner and outer positions, an electrically conductive elongated body member, said pressure chamber being fixed at one end of said body member with said diaphragm in electrical contact with a portion of said body member when said diaphragm is in its outer position, means electrically insulating said pressure chamber from said body member when said diaphragm is in its inner position, said body member at its other end comprising a stud portion having a threaded end adapted to screw into the inner end of the metal interior sleeve of said inflation valve so that said one end of said body member projects outwardly of the inner end of the tire valve, means allowing the passage of air through said interior sleeve and past said threaded end of said stud portion for inflating the tire, and means for electrically connecting said diaphragm to the metal rim of the tire wheel, said pressure chamber being pressurized with gas to a degree corresponding to normal inflation for a given tire, whereby said diaphragm will move from its outer to its inner position when surrounding air pressure is brought up to the same value as that within said chamber, regardless of the surrounding air temperature.

4. An air inflation indicator as defined in claim 3, wherein said air passage allowing means comprises a diametrical slot formed in said threaded end of said stud portion.

5. An air inflation indicator as defined in claim 3 wherein said diaphragm connecting means comprises a flexible electrical lead electrically connected to said diaphragm and adapted to be clamped between the tire rim and the tire bead upon installation of the tire.

6. An inflation indicator as defined in claim 3 wherein said diaphragm is circular in shape and comprised of thin sheet metal, and wherein said pressure chamber further comprises a hemispherical shell portion of sheet metal peripherally secured to said diaphragm, said diaphragm connecting means comprising an electrical lead connected to the outside of said shell portion.

7. An inflation indicator as defined in claim 6 wherein said body member is of metal and is integrally formed at the other end of said stud portion with an enlarged head portion formed with a cylindrical recess within which is disposed the diaphragm end of said pressure chamber, and wherein said electrically insulating means comprises an insulating ring arranged between the diaphragm end of said pressure chamber and the inside of said cylindrical recess.

References Cited by the Examiner

UNITED STATES PATENTS

| | | | |
|---|---|---|---|
| 1,812,012 | 6/1931 | Muzzy | 340—59 |
| 1,880,401 | 10/1932 | Bohham | 200—61.25 |
| 2,442,104 | 5/1948 | Twombly | 300—61.22 |
| 2,447,777 | 8/1948 | Slovack | 200—61.25 |
| 2,482,984 | 9/1948 | Lana et al. | 340—58 |
| 2,510,785 | 6/1950 | Potts et al. | 340—58 |
| 2,554,594 | 5/1951 | Shea | 340—58 |
| 2,708,743 | 5/1955 | Dall'Olio | 340—58 |
| 2,716,167 | 8/1955 | Jacobus | 340—58 |
| 2,725,434 | 11/1955 | Brodsky | 340—58 |
| 2,727,221 | 12/1955 | Sprigg | 340—58 |
| 2,868,908 | 1/1959 | Robinson | 200—61.25 |

FOREIGN PATENTS 198,978  6/1908  Germany.

NEIL C. READ, *Primary Examiner.*

ROBERT H. ROSE, *Examiner.*

T. A. ROBINSON, WALTER C. GLEICHMAN,
*Assistant Examiners.*